United States Patent [19]

Day et al.

[11] 4,161,801

[45] Jul. 24, 1979

[54] FLUID STRIPPING APPARATUS

[76] Inventors: David R. Day, 637 Princeton Rd., Berkely, Mich. 48072; Lucian G. McElroy, 3315 Brocker Rd., Metamora, Mich. 48455

[21] Appl. No.: 887,040

[22] Filed: Mar. 16, 1978

[51] Int. Cl.² ............................................. B60S 3/04
[52] U.S. Cl. ............................. 15/316 R; 15/DIG. 2; 15/312 A
[58] Field of Search ............. 15/DIG. 2, 97 B, 312 R, 15/316 R, 405, 312 A

[56] References Cited

U.S. PATENT DOCUMENTS

| | | | |
|---|---|---|---|
| 3,003,177 | 10/1961 | Hijiya | 15/312 A |
| 3,600,224 | 8/1971 | Stilwell | 15/302 X |

*Primary Examiner*—Christopher K. Moore
*Attorney, Agent, or Firm*—McGlynn and Milton

[57] ABSTRACT

An apparatus for stripping fluids from the surface of an object including a flexible, inflatable bag of generally rectangular transverse cross section including an inlet for introducing air under pressure into the bag and an elongated opening at one end of the bag defining a nozzle for emitting a stream of air and an air distributor for supplying air to the bag and for supporting the bag so that it extends toward the object wherein the nozzle end of said bag lies in the path of motion of the object to cause physical engagement between the nozzle end of the bag and the object to bring the stream of air emitted from the nozzle opening into close spacial relationship with the surface of the object.

14 Claims, 6 Drawing Figures

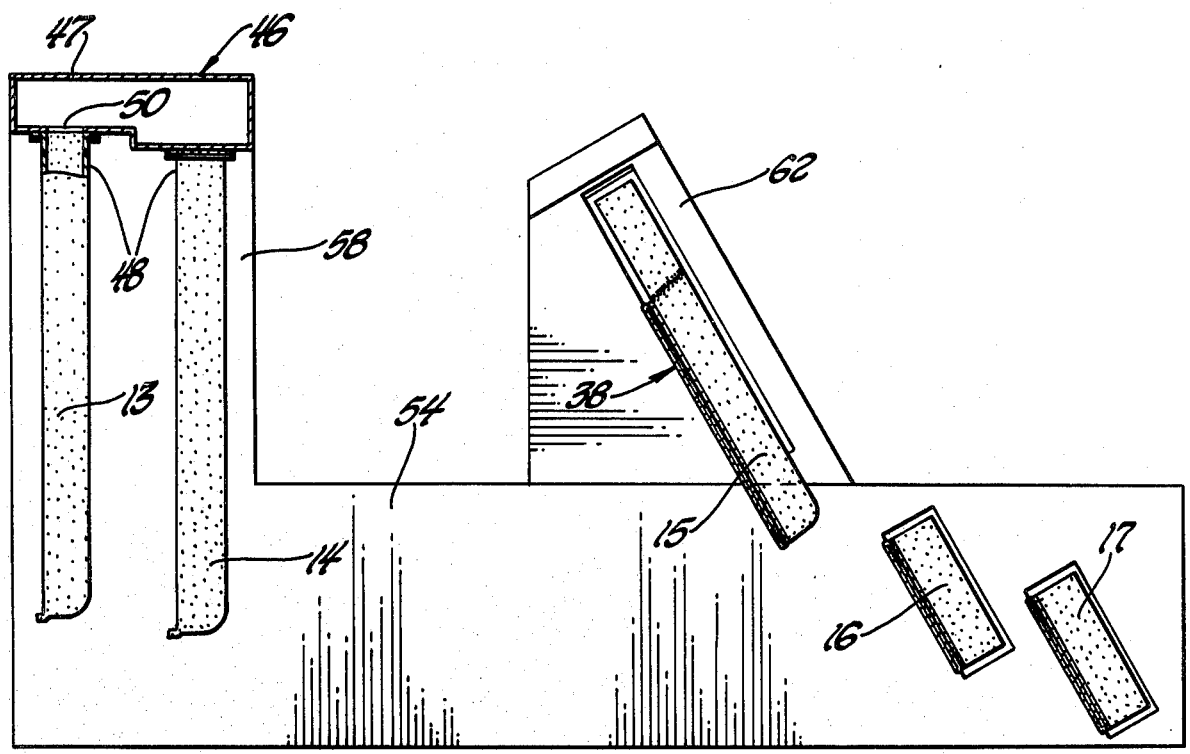
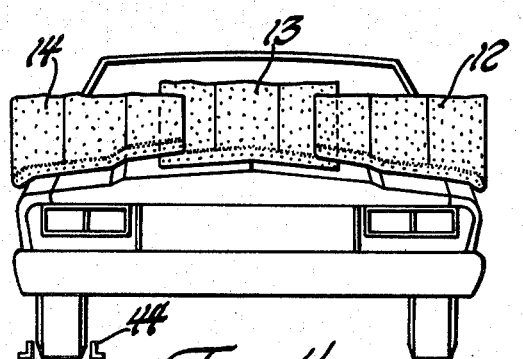
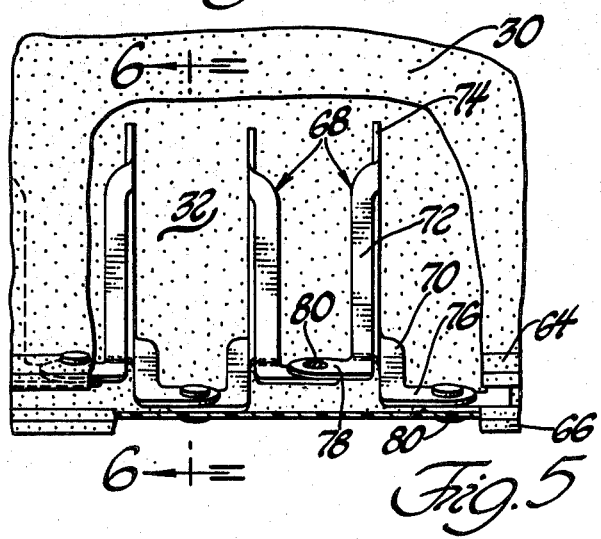
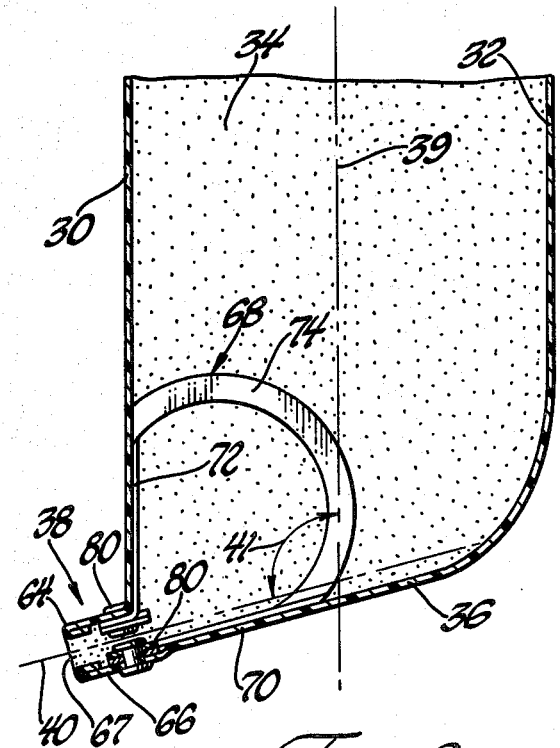

FLUID STRIPPING APPARATUS

FIELD OF THE INVENTION

This invention relates to a fluid stripping apparatus for stripping fluid from an object. The invention is particularly applicable for use in carwash systems for stripping rinse water from vehicles.

BACKGROUND OF THE INVENTION

Conventional carwash systems include a drying station near the exit end of the carwash line for drying rinse water from the surface of vehicles. The sides of each vehicle are dried by stationary blower units located on the sides of the carwash line which include one or more vertical nozzles. In order to accomodate vehicles of various sizes, the stationary nozzles must be located some distance from the path of the vehicles; hence, there is a space between twelve and eighteen inches between the nozzles and the surface being dried. The top surface of the vehicles is dried by one or more overhead blower ducts. The overhead blower ducts are hinged at one end to permit vertical movement and normally include a roller-type follower at its free end for following the longitudinal contour of the vehicle. Since the overhead blower ducts are capable of removal with respect to the carwash line, the nozzles can be brought closer to the surface of the vehicle than the side nozzles. However, there is still a relatively large space between the nozzle and the surface of the vehicle.

As should be apparent, the effectiveness of the air as a drying medium falls off rapidly as the distance between the source of air (nozzle) and the surface increases. Hence, large blowers are required in carwash systems to supply air in sufficient quantity and velocity to achieve adequate drying of the vehicle. Typically, the drying station of a carwash system employs two or more 40 horsepower electric motors to drive the blowers in order to attempt adequate drying. Power usage is therefore very great. Moreover, even when operating at their best, such drying stations do not completely dry the vehicle and manual detailing is oftentimes required to complete the job. As a result there is a distinct need for a drying station apparatus for removing fluids from a vehicle which reduces power and labor costs in a carwash system.

BRIEF SUMMARY OF THE INVENTION

This invention relies upon the principle that less power is required to remove fluid from a surface if most of the fluid is stripped from the surface. More specifically, it is well-known that the velocity of air emmitted from a nozzle falls off inversely proportional to the square of the distance from the nozzle, i.e. $v = (n) 1/d^2$; where v is the velocity of the air stream, d is the distance from the nozzle, and n is a constant. Therefore, as the distance between the nozzle and the work surface is decreased, the amount of air required to maintain a given velocity at the work surface also decreases. A reduction in the amount, or volume, of air reduces the power requirements since less air must be handled by the blowers.

In order to strip fluid from a surface it is necessary to bring the source of air very close to the surface being stripped and to direct the air so that it impinges the surface at a shallow angle. The instant invention accomplishes these objectives in a unique manner and, consequently, provides an apparatus for stripping fluid which is particularly applicable for use in carwash systems since it removes fluids from the surface of the vehicle much more efficiently than conventional drying stations and uses significantly less power.

As suggested above, the instant invention provides an apparatus which strips fluid from the surface by bringing the air emitting nozzle into close spacial relationship with the surface of the vehicle. This is accomplished by employing a flexible, inflatable bag of generally rectangular transverse cross section which supports an air emitting nozzle. The bag is inflated through a inlet for introducing air under pressure into the bag. An elongated opening is formed at one end of the bag which defines a nozzle for emitting a stream of air. When inflated, the bag supports the nozzle so that it can be oriented properly with respect to a surface to be stripped of fluid. Additionally, since the bag is flexible even when inflated the nozzle can move in response to changes in the contour of the surface. By using the inflatable bag the nozzle can be brought close to the surface being stripped of fluid and maintained in this position without damaging the surface.

In a carwash system multiple bags are supported in an array so that they extend toward the vehicle to be stripped. The nozzle ends of the bags lie in the path of motion of the vehicle. As the vehicle is moved through the carwash by means of a typical conveyor mechanism, the nozzle ends of the bags physically engage the surface of the vehicle to bring the stream of air emitted from the nozzle into close spacial relationship with the surface of the vehicle. The nozzle openings in the bags are located so that the stream of air emitted is directed oppositely to the direction of motion of the vehicle. Since the bag is flexible, it is capable of following the longitudinal contour of the vehicle as the vehicle moves past the bag. The air pressure in the bag, however, tends to urge the nozzle of the bag toward the vehicle to thereby keep the end of the bag against the vehicle and to keep the nozzle in close spacial relationship with the surface of the vehicle.

PRIOR ART STATEMENT

The U.S. Pat. to Allen No. 3,263,341 discloses a carwash system which includes a drying station including a plurality of drying heads connected to tubes to an air distributor. The drying heads are located in the path of the vehicle being conveyed through the carwash so that the drying heads engage the surface of the vehicle. A high velocity stream of air is emitted through slots in the drying heads and impinges the surface of the vehicle at a shallow angle to strip fluids from the surface. The disclosure in this patent recognizes the advantage of bringing the stream of air into close spacial relationship with the surface to strip fluid from the surface.

The U.S. Pat. to Hijiya No. 3,003,177 discloses the use of an elongated, inflatable, tubular bag including spaced openings along its length defining nozzles for directing multiple streams of air at an object being cleaned.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a front elevational view of a vehicle being stripped of fluid by apparatuses constructed in accordance with the instant invention;

FIG. 5 is a broken away view of a detail of the instant invention which is partly in cross section; and FIG. 6 is a view taken generally along line 6—6 of FIG. 5.

DETAILED DESCRIPTION OF THE INVENTION

Figure 1:
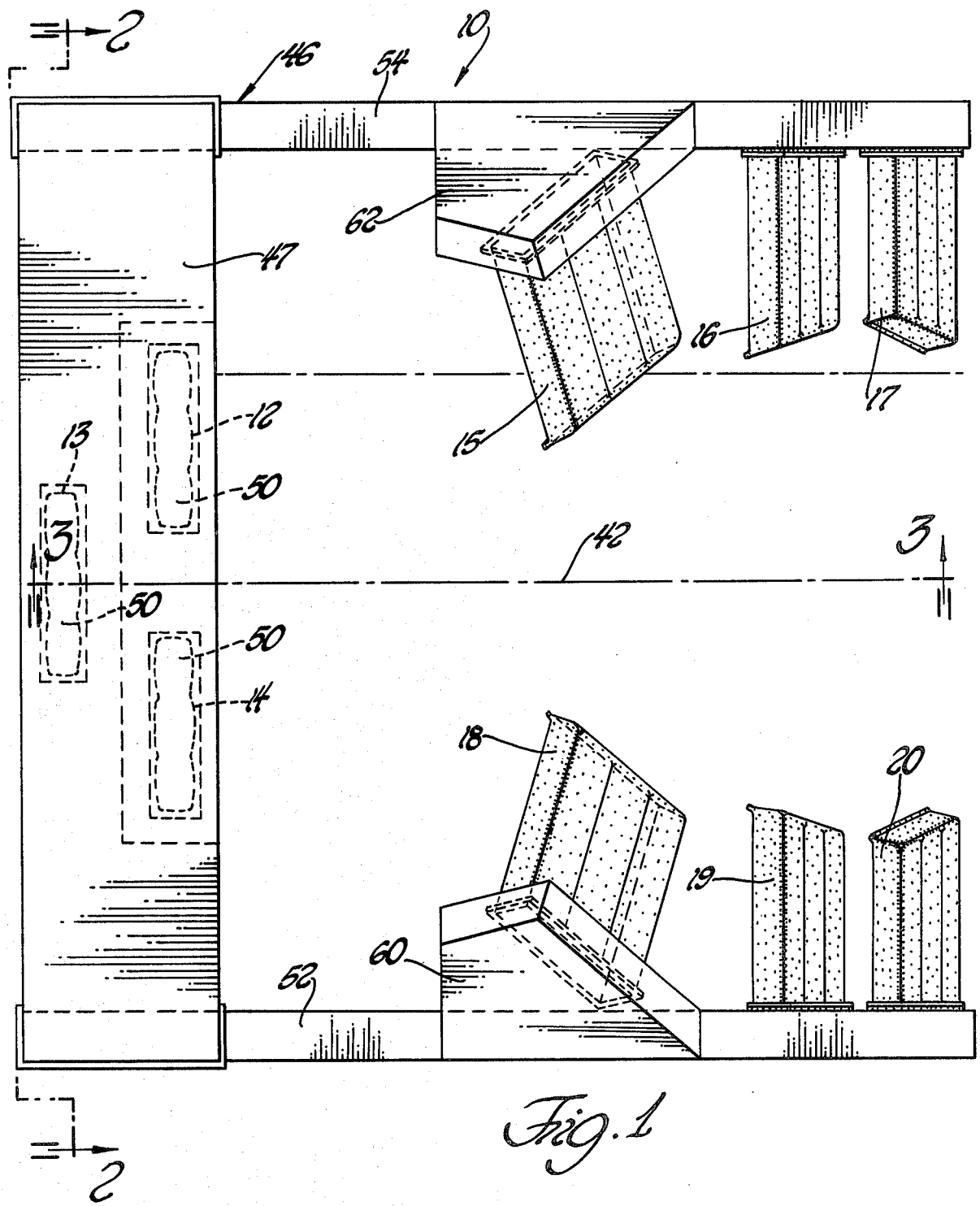
FIG. 1 is a plan view of a drying station in a carwash system constructed in accordance with the instant invention.

Referring more particularly to the drawings, the drying station of a carwash system is generally shown at 10 in FIG. 1. While the instant invention has broader application, it is described herein with reference to a carwash system since it is particularly applicable to such systems.

The improvement in the drying station of a carwash system is achieved by employing a plurality of flexible, inflatable bags 12–20. All of the bags are essentially similar in that they are made from flexible sheet material, such as thin plastic or a plastic coated cloth. Pieces of the material are sewn together to form the desired shape which is very much like that of an enlarged air mattress. Suitable flexible gussets may be stitched into the bags to help maintain their shape. As shown in the drawings, the bags are generally rectangular as viewed in the plan and have a generally rectangular transverse cross section.

Each of the bags includes an elongated opening at one end which defines a nozzle for emitting a stream of air when the bag is inflated. A typical nozzle end of a bag is shown in FIG. 6. The end of the bag includes a front panel 30 and a rear panel 32. The front and rear panels 30 and 32 are joined by side panels 34, only one of which is shown in FIG. 6, which is a cross sectional view. An end panel 36 joins the side panels 34 with the rear panel 32. An elongated opening generally shown at 38, is formed at the juncture between the front panel 30 and the end panel 36 and extends over essentially the entire width of the bag.

As indicated in FIG. 6, the elongated opening 38 opens in a direction generally outwardly from the front panel 30. As viewed in FIG. 1, a vehicle being conveyed through the carwash system would move from left to right through the drying station 10. In order to strip fluids from the surface of the vehicle, the bags 12–20 are arranged so that the air emitted from the elongated openings is directed oppositely to the direction of the movement of the vehicle.

As shown in FIG. 6, the longitudinal plane of the bag is shown by the line 39. The plane defined by the stream of air being emitted through the nozzle 38 is indicated by line 40 and intersects the longitudinal plane 39 of the bag at an angle 41. The angle between the two planes 39 and 40 determines the direction in which the air stream is directed with respect to the bag when the bag is inflated. The bags are supported by an air distributor in an array around the sides and top of the path of the vehicle. The bags are mounted so that, when inflated, they extend toward the path of the vehicle which is generally indicated by line 42 in FIG. 1. Before being engaged by the vehicle, the longitudinal plane 39 of the bags intersect the vehicle plane 43 of the vehicle's path perpendicularly or at a slight angle. The angle 41 of the air stream is selected so that the air stream is directed generally toward the oncoming vehicle.

Figure 2:
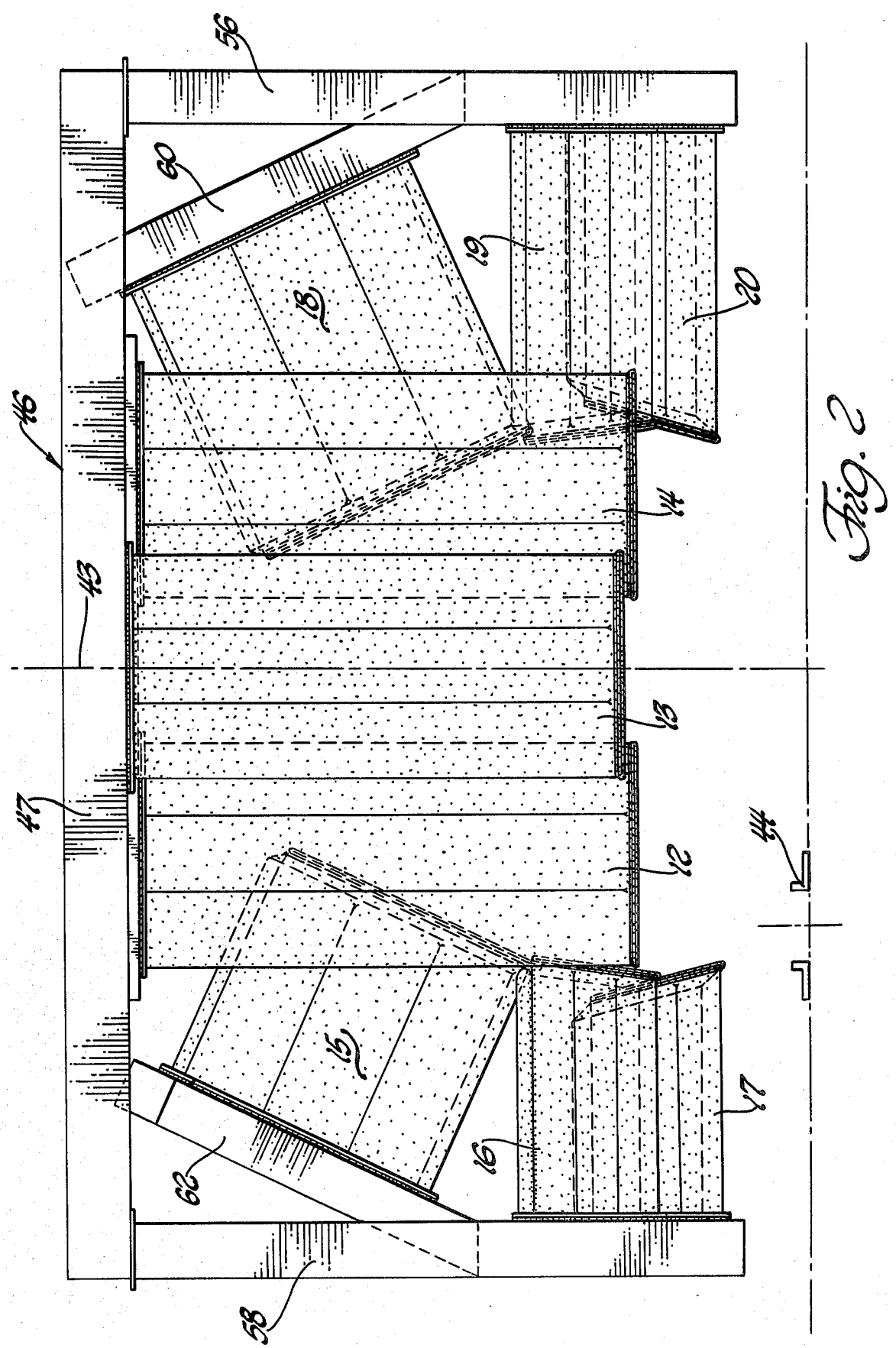
FIG. 2 is a side elevational view taken generally along line 3—3 of FIG. 1.

As noted above, the air bags are supported in an array along the path of the vehicle as shown in FIGS. 1–3 to strip fluid from the top and side surfaces of the vehicle. As is typical of carwash systems, the vehicle is conveyed through the carwash system along a track 44 by means of a roller and chain conveyor (not shown). Hence, in this type of carwash system, the vehicle, that is the object being stripped of fluid, is moved through a fixed drying station. However, the system could easily be modified to move the drying station relative to the vehicle.

As shown in FIGS. 1–3 the bags 12–20 are supported by an air distributor generally indicated at 46. The air distributor 46 includes an overhead duct 47 which may be supported by the ceiling superstructure of the building which houses the carwash system. Attached to the underside of the overhead duct 47 are three of the bags 12, 13 and 14 which hang downwardly into the path of the vehicle. The inlet end 48 of the bags, as best shown in FIG. 3, are connected to openings 50 in the overhead duct 47. As viewed in FIG. 3, the nozzles in the overhead bags 12, 13 and 14 face toward the left, that is, toward an oncoming vehicle. The length of the bags locate the nozzles at approximately bumper height.

A pair of side ducts 52 and 54 are located parallel to one another, one on either side of the path of the vehicle. The side ducts 52 and 54 are connected to the overhead duct 47 by downwardly extending connecting ducts 56 and 58.

Each of the two side ducts 52 and 54 supports a pair of the bags 19 and 20, 16 and 17, respectively. These bags have their inlet ends connected to openings in the side ducts. The side bags 16, 17, 19, and 20 extend generally perpendicularly from the side ducts 52 and 54 toward the path of the vehicle and have sufficient length so that their nozzle ends will engage the oncoming vehicle. As shown in FIG. 3, the side bag 16 is first engaged by the oncoming vehicle and is mounted higher than the second side bag 17. Both bags are canted slightly with respect to the vertical and have their upper edges tilted toward the oncoming vehicle. In this manner fluid on the surface of the vehicle is forced progressively downwardly by the successive side bags.

The side ducts 52 and 54 include extension ducts 60 and 62 which extend upwardly and inwardly with respect to the path of the vehicle. Each of the extension ducts 60 and 62 supports a bag which is connected to an opening in the extension duct. The bags supported by the extension ducts 60 and 62 extend downwardly toward the path of the vehicle from the sides of the vehicle's path. As shown in FIG. 3, the bags supported by the extension ducts 60 and 62 are also canted with respect to the vertical in the same manner as the side bags.

It should be apparent from the foregoing that all of the ducts in the air distributor 46 are interconnected. Therefore, one or more blower units can be connected to the air distributor at convenient locations to supply air under pressure to the entire air distributor.

Due to the restriction at the outlet end of the bags provided by the nozzles a backpressure is created slightly greater than atmospheric pressure to keep the bags in an inflated condition. Since the pressure within the bags determines the flexibility of the bag, excessive pressure will result in the bags being too rigid. Consequently, the bags will not track over the surface of the vehicle. For the size and type of materials used a pressure of ⅓ pounds over atmospheric has been found suitable.

When inflated the air pressure in the bags causes the bags to be somewhat stiff or rigid. Hence, even though the bags are made from a flexible material, they are self-supporting when inflated. The bags, however, are sufficiently deformable under an applied force so that, when engaged by a vehicle moving through the carwash, the bags are pushed aside. In this manner the nozzles are caused to wipe the top and sides of the vehicle. As shown in FIG. 1, the overhead bags are the first to engage the vehicle to strip fluids from the top of the vehicle and force the fluids rearwardly and downwardly. The bags supported by the extension ducts 60 and 62 then engage the sides of the vehicle followed by the side bags 15, 16, 19 and 20. These bags are arranged to force the fluids on the vehicle rearwardly and progressively downwardly.

The nozzles of the bags are constructed so that they are flexible along their length so that the nozzles conform to the transverse contour of the vehicle to maintain the stream of air in close spacial relationship to the surface. In order to impart sufficient flexibility to the nozzles, the nozzle ends of the bags are preferrably constructed in the manner shown in FIGS. 5 and 6 although other constructions may serve as well.

The end 64 or free edge of the front panel 30 is turned outwardly and is aligned generally parallel to the end 66 or free edge or the end panel 36 and is spaced apart therefrom. The ends of these two edges are turned under and stitched to finish the edges. The opening 67 between the two free edges 64 and 66 is maintained by a plurality of interconnected link members generally indicated at 68. Each link member includes a pair of legs 70 and 72 wherein one leg lies against a portion of the front panel 30 and the other leg lies against a portion of the end panel 36, both legs extending away from the opening 67. The two legs of each link member 68 are connected by an arcuate connecting member 74. A foot member 76, 78 is located at the end of each leg 70, 72. The front member 78 at the end of the leg 72 lying against a front panel 30 is turned into the plane of the opening 67 and the two foot members 76 and 78 extend in opposite directions along the length of the opening 67. The foot members are connected to the bag material along the opening 67 and to the foot member of an adjacent leg member 68 by rivets 80. The leg members 68 are made of sheet metal or plastic and, due to their configuration, are resiliently flexible.

The air pressure in the bags urges the bags toward the normal extended position shown in FIGS. 1-3; hence, movement away from these positions is resisted. The nozzle ends of the bags are, therefore, held against the surface of the vehicle by the air pressure within the bags. This force deforms the nozzles so that they tend to conform to the transverse contour of the vehicle surface. This performance is shown in FIG. 4 with respect to the overhead bags 12, 13 and 14 which indicates that, despite changes in the hood line of the vehicle, the nozzle ends conform to the transverse contour of the vehicle.

As should be apparent from the foregoing description, as a vehicle passes through a drying station constructed in accordance with the instant invention, the rinse water on the surface of the vehicle will be effectively stripped off. It has been found that the power requirements for driving the blowers can be reduced by more than 50% and probably as much as 90% due to the reduced amount of air required. Hence, significant savings can be made by employing the concept of the instant invention.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that the invention may be practiced otherwise than as specifically described herein and yet remain within the scope of the appended claims.

The embodiments of the invention in which an exclusive property or privilege is claimed are defined as follows:

1. An apparatus for stripping fluids from the surface of an object comprising: a flexible, inflatable bag of generally rectangular transverse cross section including an elongated inlet for introducing air under pressure into said bag and an elongated opening at one end of said bag defining a nozzle of smaller area than said inlet for emitting a stream of air while maintaining the bag in a nonflailing orientation and rigidly inflated; means for effecting relative motion between said bag and the object to be stripped; and support means for supporting said rigidly inflated bag so that it extends toward the object and wherein the nozzle end of said bag lies in the path of motion of the object as said bag is rigidly inflated to cause physical engagement between the nozzle end of said bag and the object to bring the stream of air emitted from said nozzle opening into close spacial relationship with the surface of the object, said nozzle being orientated to direct the stream of air in a direction to strip the object as the bag is rigidly inflated.

2. An apparatus for stripping fluids from the surface of an object comprising: a flexible inflatable bag of generally rectangular transverse cross section including an inlet for introducing air under pressure into said bag and a flexible nozzle having an elongated opening of smaller area than said inlet at one end of said bag for emitting a stream of air while maintaining the bag in a nonflailing orientation and rigidly inflated; means for effecting relative motion between said bag and the object to be stripped thereby defining a relative path of motion; and support means for supporting said rigidly inflated bag so that it extends toward the path of the object and wherein said nozzle opening lies in and across the path of the object as said bag is rigidly inflated whereby upon relative motion the nozzle end of said bag engages the object to bring the air stream into close spacial relationship to the surface of the object and follows the longitudinal and transverse contour of the object, said nozzle being orientated to direct the stream of air in a direction to strip the object as the bag is rigidly inflated.

3. An apparatus for stripping fluid from the surface of a vehicle as the vehicle is conveyed along a path through a carwash comprising: an air distributor; a plurality of flexible, inflatable bags each of a generally rectangular transverse cross section, said bags supported by said air distributor in an array along the path of the vehicle to strip fluid from the top and side surfaces of the vehicle, each of said bags including an inlet end connected to said air distributor for introducing air under pressure into said bag and a nozzle end of smaller area than said inlet end spaced apart from said inlet end for emitting a stream of air while maintaining the bag in a nonflailing orientation and rigidly inflated; each of said bags extending from said air distributor into the path of the vehicle as said each bag is rigidly inflated and self-supporting and resiliently flexible upon inflation to permit movement toward and away from the path of the vehicle in response to the longitudinal contour of the vehicle, the air in each bag urging the nozzle end thereof against the vehicle to bring the stream of air into close spacial relationship with the surface of the vehicle, said nozzle end of each bag being orientated to direct the stream of air in a direction to strip the vehicle as each bag is rigidly inflated.

4. An apparatus as set forth in claim 3 wherein said nozzle end of said bag includes a flexible nozzle deformable along its longitudinal axis for following the transverse contour of the vehicle.

5. An apparatus as set forth in claim 3 wherein said bags each have a longitudinal plane when inflated with the longitudinal planes of at least two of said bags being canted relative to one another.

6. An apparatus as set forth in claim 3 wherein each of said inlet ends of said bags define an elongated inlet of generally rectangular cross section.

7. An apparatus as set forth in claim 6 wherein each of said elongated inlets is disposed in a plane.

8. An apparatus as set forth in claim 7 wherein said planes of at least two of said elongated inlets are canted relative to one another.

9. An apparatus as set forth in claim 3 wherein said bags include at least one middle bag extending downwardly for movement in a vertical plane, and at least two side bags disposed on opposite sides of the path of the vehicle, said side bags being supported for movement in planes which are respectively canted with respect to vertical and horizontal planes.

10. An apparatus as set forth in claim 9 including at least two adjacent side bags disposed on each side of the path of the vehicle with said adjacent side bags being supported for movement in planes which are canted relative to one another.

11. An apparatus as set forth in claim 3 wherein said nozzle end defines an elongated nozzle opening extending transversely across each of said bags and having an area smaller than the transverse cross-sectional area of the associated bag, said nozzle opening opens in a direction transverse to the longitudinal axis of the associated bag which extends between said ends thereof.

12. A bag for use as an air distributor; said bag being flexible and rigidly inflatable and of a generally rectangular transverse cross section, said bag having an inlet end for introducing air under pressure into said bag and a nozzle end spaced apart from said inlet end for emitting a stream of air, said inlet end defining an opening contiguous with the periphery of the generally rectangular transverse cross section of the bag, said nozzle end defining an elongated nozzle opening extending transversely across said bag and having an area smaller than the transverse cross-sectional area of said bag for maintaining the bag in a nonflailing orientation and rigidly inflated with said nozzle end orientated to direct the stream of air against an object engaging the nozzle end of the bag.

13. A bag as set forth in claim 12 wherein said nozzle opening opens in a direction transverse to the longitudinal axis of the bag which extends between said ends thereof.

14. A bag as set forth in claim 12 wherein said bag comprises front and rear panels joined by side panels and an end panel joining said side panels and said rear panel, said nozzle opening being disposed between said end panel and said front panel.

* * * * *